(12) United States Patent
van Dijk et al.

(10) Patent No.: US 8,875,263 B1
(45) Date of Patent: Oct. 28, 2014

(54) CONTROLLING A SOFT TOKEN RUNNING WITHIN AN ELECTRONIC APPARATUS

(75) Inventors: Marten van Dijk, Somerville, MA (US);
Kevin D. Bowers, Melrose, MA (US);
John G. Brainard, Sudbury, MA (US);
Samuel Curry, Andover, MA (US);
Sean P. Doyle, Edmonds, WA (US);
Michael J. O'Malley, Lowell, MA (US);
Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/434,272

(22) Filed: Mar. 29, 2012

(51) Int. Cl.
*G06F 21/00* (2013.01)
*H04L 9/16* (2006.01)
*H04L 29/06* (2006.01)
*G06F 21/31* (2013.01)
*H04L 9/32* (2006.01)
*G06F 21/42* (2013.01)

(52) U.S. Cl.
CPC ............... *G06F 21/31* (2013.01); *H04L 63/08* (2013.01); *H04L 9/3228* (2013.01); *H04L 63/18* (2013.01); *G06F 21/42* (2013.01)
USPC ............. 726/6; 726/3; 726/5; 726/7; 709/225

(58) Field of Classification Search
None
See application file for complete search history.

(56) References Cited

U.S. PATENT DOCUMENTS

| | | | |
|---|---|---|---|
| 6,931,380 B2 | 8/2005 | Shedd et al. | |
| 7,529,710 B1 | 5/2009 | Clower et al. | |
| 7,725,730 B2 | 5/2010 | Juels et al. | |
| 7,810,147 B2 | 10/2010 | Duane et al. | |
| 7,831,837 B1 | 11/2010 | Duane et al. | |
| 7,849,323 B2 | 12/2010 | Field et al. | |
| 7,904,946 B1 * | 3/2011 | Chu et al. | 726/5 |
| 7,973,607 B1 | 7/2011 | Ciaffi et al. | |
| 2003/0163739 A1 * | 8/2003 | Armington et al. | 713/202 |
| 2007/0022196 A1 * | 1/2007 | Agrawal | 709/225 |
| 2008/0141037 A1 * | 6/2008 | Cheston et al. | 713/184 |
| 2008/0261560 A1 * | 10/2008 | Ruckart | 455/411 |
| 2010/0180328 A1 * | 7/2010 | Moas et al. | 726/6 |
| 2013/0133055 A1 * | 5/2013 | Ali et al. | 726/7 |

* cited by examiner

*Primary Examiner* — Jung Kim
*Assistant Examiner* — Janusz Kusyk
(74) *Attorney, Agent, or Firm* — BainwoodHuang

(57) ABSTRACT

A technique controls a soft token running within an electronic apparatus. The technique involves providing an initial series of authentication codes based on a first set of machine states. The initial series of authentication codes is provided from the electronic apparatus to a server through a forward channel to authenticate a user. The technique further involves receiving a command from the server through a reverse channel between the electronic apparatus and the server. The reverse channel provides communications in a direction opposite to that of the forward channel. The technique further involves changing the first set of machine states to a second set of machine states in response to the command, and providing a new series of authentication codes based on the second set of machine states. The new series of authentication codes is provided from the electronic apparatus to the server through the forward channel for user authentication.

18 Claims, 5 Drawing Sheets

CONTROLLING A SOFT TOKEN RUNNING WITHIN AN ELECTRONIC APPARATUS

BACKGROUND

A conventional authentication system includes an authentication client which runs authenticator software (sometimes called a soft token) and an authentication server which work together to grant a holder of the authentication client with access to an electronic resource using one-time use passwords (OTPs). Such OTPs are often referred to as OTP codes, one-time passcodes, and pseudo-random numbers, among other terms. To this end, both the soft token and the authentication server share a cryptographic key which is not otherwise known. The soft token uses the cryptographic key to produce a series of OTPs. Concurrently, the authentication server carries out the same operations on its end to produce the same series of OTPs. Accordingly, at any time, the holder of the soft token is capable of providing a matching OTP to the authentication server to prove that the holder possesses the soft token.

Prior to activation of the soft token on the authentication client, the soft token is provisioned with an initial seed. Additionally, the soft token takes other input prior to activation such as a time input and an initial key generation algorithm.

However, once the soft token is activated to begin producing a series of OTPs, the soft token is prevented from accepting further provisioning input. Rather, the soft token becomes tamper resistant once it begins producing OTPs. In some instances, the soft token may be configured to stop operation if the soft token detects tampering.

SUMMARY

Unfortunately, once a soft token has been programmed (e.g., with an initial seed and an initial key generation algorithm) and has begun to produce OTPs, authentication server input is not allowed. Nevertheless, it has been recognized that authentication security could be advanced if a soft token is constructed and arranged to utilize input from an authentication server through a reverse channel, i.e., communication from the authentication server to the soft token after the soft token has been activated and has started to provide OTPs.

In contrast to the above-described conventional authentication system in which soft tokens are prevented from accepting input from an authentication server once the soft tokens are activated and have begun producing OTPs, an improved technique involves controlling a soft token through a reverse channel from an authentication server to the soft token. With the availability of such a reverse channel, the authentication server is able to direct the soft token to adjust operation such as provide additional information regarding the soft token's hardware fingerprint or software posture, change selection of sources of auxiliary information, etc. Additionally, the authentication server is able to reset aspects of the soft token such as re-seed the soft token, reset a silent alarm state of the soft token, and so on. Such reverse channel capabilities enrich the operability of the soft token as well as provide a mechanism for dynamically strengthening authentication after soft token deployment.

One embodiment is directed to a method of controlling a soft token running within an electronic apparatus. The method includes providing, by the electronic apparatus, an initial series of authentication codes based on a first set of machine states (e.g., an initial seed, an initial key generation algorithm, an initial silent alarm state, etc.). The initial series of authentication codes is provided from the electronic apparatus to a server through a forward channel to authenticate a user. The method further includes receiving, by the electronic apparatus, a modify command from the server through a reverse channel between the electronic apparatus and the server. The reverse channel provides communications in a direction opposite to that of the forward channel. The method further includes changing, by the electronic apparatus, the first set of machine states to a second set of machine states in response to the modify command (i.e., changing at least one machine state of the first set), and providing a new series of authentication codes based on the second set of machine states. The new series of authentication codes is provided from the electronic apparatus to the server through the forward channel to authenticate the user.

In some arrangements, the electronic apparatus is a mobile device such as a smart phone, a tablet, a laptop, etc. which stores the cryptographic key and which runs a soft token application. In these arrangements, each authentication code of the initial series and the new series of authentication codes includes a respective one-time use passcode (OTP).

In one arrangement, receiving the modify command from the server through the reverse channel between the electronic apparatus and the server includes obtaining the modify command via a message which is processed directly by the soft token running within the electronic apparatus. In another arrangement, receiving the modify command includes obtaining the modify command via a message which is (i) processed directly by an intermediate application running within the electronic apparatus, and (ii) conveyed from the intermediate application running within the electronic apparatus to the soft token running within the electronic apparatus. In both arrangements, the reverse channel is implemented in a secure way to guarantee confidentiality and authenticity. Accordingly, such implementation guards against attacks (e.g., replay attacks, malicious hacking, unauthorized tampering, etc.).

Other embodiments are directed to systems, assemblies, processing circuits, computer program products, and so on. Some embodiments are directed to various methods, electronic components and circuitry which are involved in controlling a soft token running within an electronic apparatus via a reverse channel.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves controlling a soft token through a reverse channel from an authentication server to the soft token. With the availability of such a reverse channel, the authentication server is able to direct the soft token to adjust operation such as provide additional information regarding the soft token's hardware fingerprint or software posture, change selection of sources of auxiliary information, etc. Furthermore, the authentication server is able to reset certain operational aspects of the soft token such as re-seed the soft token, reset a silent alarm state of the soft token, and so on. Such reverse channel capabilities enrich the operability of the soft token as well as provide a mechanism for dynamically strengthening authentication after soft token deployment.

Figure 1:
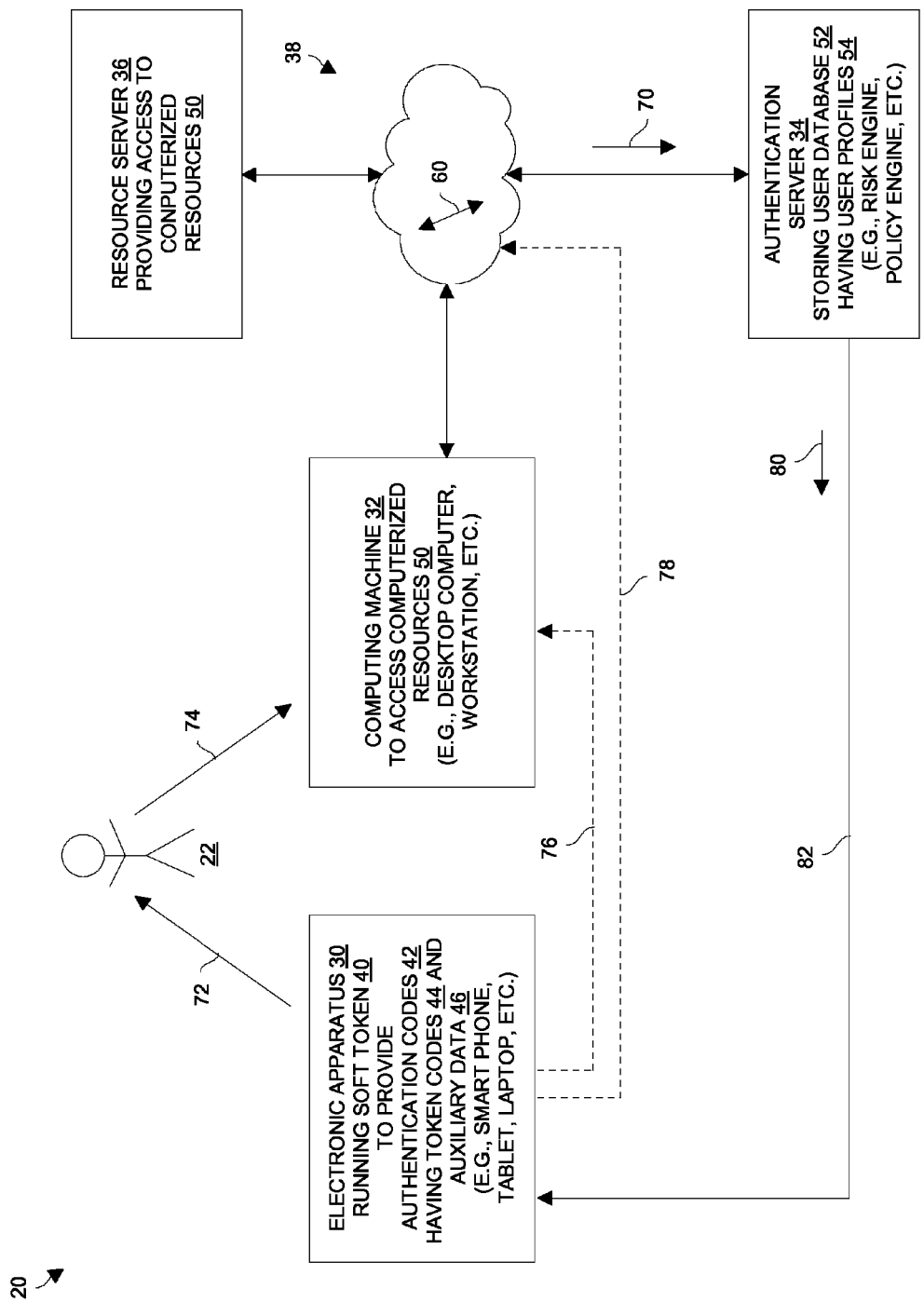
FIG. 1 is a block diagram of an electronic environment which utilizes both a forward channel from a soft token on an electronic apparatus to an authentication server, and a reverse channel from an authentication server back to the soft token.

FIG. 1 is a block diagram of an electronic environment 20 which utilizes a reverse channel for soft token control following deployment to a user 22. The electronic environment 20 includes an electronic apparatus 30, a computing machine 32, an authentication server 34, a resource server 36, and a communications medium 38.

The electronic apparatus 30 runs a soft token 40 to provide authentication codes 42 having token codes 44 (e.g., OTPs) and auxiliary data 46 (e.g., hardware fingerprints, software posture, biometric factors, silent alarms, etc.) for authenticating the user 22. Such authentication codes 42 provide a stronger means of authenticating the user 22 compared to bare conventional token codes. Examples of suitable electronic apparatus 30 include smart phones, wireless book readers, tablets, netbooks, laptops, other types of mobile devices, and general client-style devices that are capable of running the soft token 40.

The computing machine 32 is constructed and arranged to facilitate user access to a computerized resource 50. Examples of suitable computing machines 32 include desktop PCs, workstations, general purpose computers, and so on.

The authentication server 34 includes a user database 52. The authentication server 34 is constructed and arranged to store user profiles 54 for multiple users in the user database 52, and to perform authentication operations using the user profiles 54. The user profiles 54 store user-specific data defining expected authentication factors. In some arrangements, authentication server 34 includes a risk engine and/or policy engine to perform complex authentication operations based on multiple risk-based authentication factors.

The resource server 36 provides access to one or more computerized resources 50 following successful user authentication with the authentication server 34. An example of a suitable resource provider 36 is a data storage array which provides secure access to files, directories, volumes, LUNs, etc. Another example of a suitable resource provider 36 is a web server which provides secure access to various web pages. Yet another example of a suitable resource provider 36 is a server which provides secure user account and/or transactional access such as that for an online banking site, an online store, an online gaming site, and so on. Other types of resource providers 36 are suitable for use as well (e.g., ISPs, VPNs, etc.).

It should be understood that the computerized resources 50 are shown as residing on the resource provider 36 by way of example only. In other arrangements, the computerized resources 50 reside at different locations, e.g., locally on the computing machine 32, co-located at the authentication server 34, within the electronic apparatus 30, etc.

The communications medium 38 connects the various components of the electronic environment 20 together to enable these components to exchange electronic signals 60 (e.g., see the double arrow 60). At least a portion of the communications medium 38 is illustrated as a cloud to indicate that the communications medium 38 is capable of having a variety of different topologies including backbone, hub-and-spoke, loop, irregular, combinations thereof, and so on. Along these lines, the communications medium 38 may include copper-based devices and cabling, fiber optic devices and cabling, wireless devices, combinations thereof, etc.

During operation, the user 22 is capable of authenticating with the authentication server 34. In particular, the user 22 operates the soft token 40 running on the electronic apparatus 30 to obtain an initial series of authentication codes 42 based on an initial set of machine states (e.g., an initial key, an initial set of cryptographic algorithms, an initial policy for providing auxiliary information 46, etc.). This initial series of authentication codes 42 is provided through a forward channel 70 to authenticate the user 22, i.e., see arrow 70 leading from the electronic apparatus 30 to the authentication server 34.

It should be understood that the forward channel 70 which extends from the electronic apparatus 30 to the authentication server 34 may take the form of different paths. That is, there are a variety of different ways to properly convey the authentication codes 42 from the electronic apparatus 30 to the authentication server 34.

In some arrangements, the user 22 views the authentication code 42 on a display screen of the electronic apparatus 30, and then manually enters the authentication code 42 into an application running on the computing machine 32 (e.g., a web browser, a front-end program, an authentication client, etc.). This situation is illustrated by the two arrows 72, 74 adjacent the user 22. The authentication code 42 then travels from the computing machine 32 to the authentication server 34 through the communications medium 38. If authentication is successful, the user 22 is then able to access the computerized resource 50 using the computing machine 32. However, if authentication is unsuccessful, the user 22 is prohibited from accessing the computerized resource 50 using the computing machine 32.

In another arrangement, the electronic apparatus 30 automatically conveys the authentication code 42 to the computing machine 32 which then sends the authentication code 42 to the authentication server 34. Such operation can be viewed by the user 22 or be transparent to the user 22. This situation is illustrated by the dashed arrow 76 leading from the electronic apparatus to the computing machine 32. Again, the user 22 is only able to access the computerized resource 50 using the computing machine 32 if authentication is successful.

In yet another arrangement, the electronic apparatus 30 automatically sends the authentication code 42 directly to the authentication server 34. This situation is illustrated by the dashed arrow 78 leading from the electronic apparatus 30 to the communications medium 38. If authentication is successful, the authentication server 34 allows the user 22 to access the computerized resource 50. Otherwise, access to the computerized resource 50 is denied.

Regardless of which paths are taken, the flow of token codes 44 forms a primary channel to the authentication server 34 and the flow of the auxiliary data 46 forms an auxiliary channel to the authentication server 34. As will be explained in further detail below, the command 80 from the authentication server 34 is capable of adjusting the operation of the soft token 40 in a manner which may modify the information flowing in one or more of these channels.

Along these lines, after the soft token 40 has been in operation for an amount of time delivering authentication codes 42 to the user 22 for use in authentication, the authentication server 34 is able to provide a command 80 back to the soft token 40. In particular, the authentication server 34 sends such a command 80 through a reverse channel 82 between the authentication server 34 and the electronic apparatus 30 but in a direction that is opposite the forward channel 70.

The command 80 from the authentication server 34 may be received by the electronic apparatus 30 via the communications medium 38 indirectly. For example, the electronic apparatus 30 may receive the command 80 through the computing machine 32. Along these lines, the electronic apparatus 30 may be able to plug into the computing machine 32 for charging or synching, and receive the command 80 at that time. Additionally, the electronic apparatus 30 may be able to communicate wirelessly with the computing machine 32 using Wi-Fi or Bluetooth technology in order to obtain the command 80.

Upon receipt of the command 80 by the electronic apparatus 30 from the authentication server 34 through the reverse channel 82, the command 80 may be able to reach the soft token 40 directly or indirectly as well. That is, the reverse channel 82 can be implemented as direct communication from the authentication server 34 to the soft token 40 if the soft token 40 is online and able to communicate. Alternatively, the authentication server 34 may be able to communicate with the soft token 40 through another application running on the electronic apparatus 30, e.g., an intermediate application such as a VPN client. In these situations, in order to avoid replay attacks and other attacks, the reverse channel 82 is preferably implemented in a secure way that guarantees confidentiality and authenticity and uses time stamping (or other mechanisms based on nonces) to provide freshness.

With the soft token 40 of the electronic apparatus 30 receiving the command 80, the soft token 40 responds by changing the initial set of machine states to a new set of machine states (e.g., a new key, a new set of cryptographic algorithms, a new policy for providing auxiliary information 46, etc.). In particular, the command 80 may direct the electronic apparatus 30 to change its source of auxiliary information. For example, the initial set of machine states may have directed the electronic apparatus 30 to provide environmental information such as hardware fingerprints and/or software posture to the authentication server 34 via the auxiliary channel. However, the new set of machine states may direct the electronic apparatus 30 to provide different information such as biometric factors, etc. through the auxiliary channel.

As another example, the command 80 may change an operational aspect of the electronic apparatus 30 such as reset the silent alarm state, change the key generation algorithm, and/or re-seed the soft token 40. Although the soft token 40 has been in operation for a period of time to authenticate the user 22, such operation allows the soft token 40 to subsequently change its operation based on input from the authentication server 34. Such a change in the soft token 40 may even alter the information through the primary channel.

Once the electronic apparatus 30 is configured with the new set of machine states, the electronic apparatus 30 is able to provide a new series of authentication codes 42 based on the new set of machine states. In particular, this new series of authentication codes 42 is provided through the forward channel 70 to authenticate the user 22 in the same manner as the initial series of authentication codes 42. Further details will now be provided with reference to FIG. 2.

Figure 2:
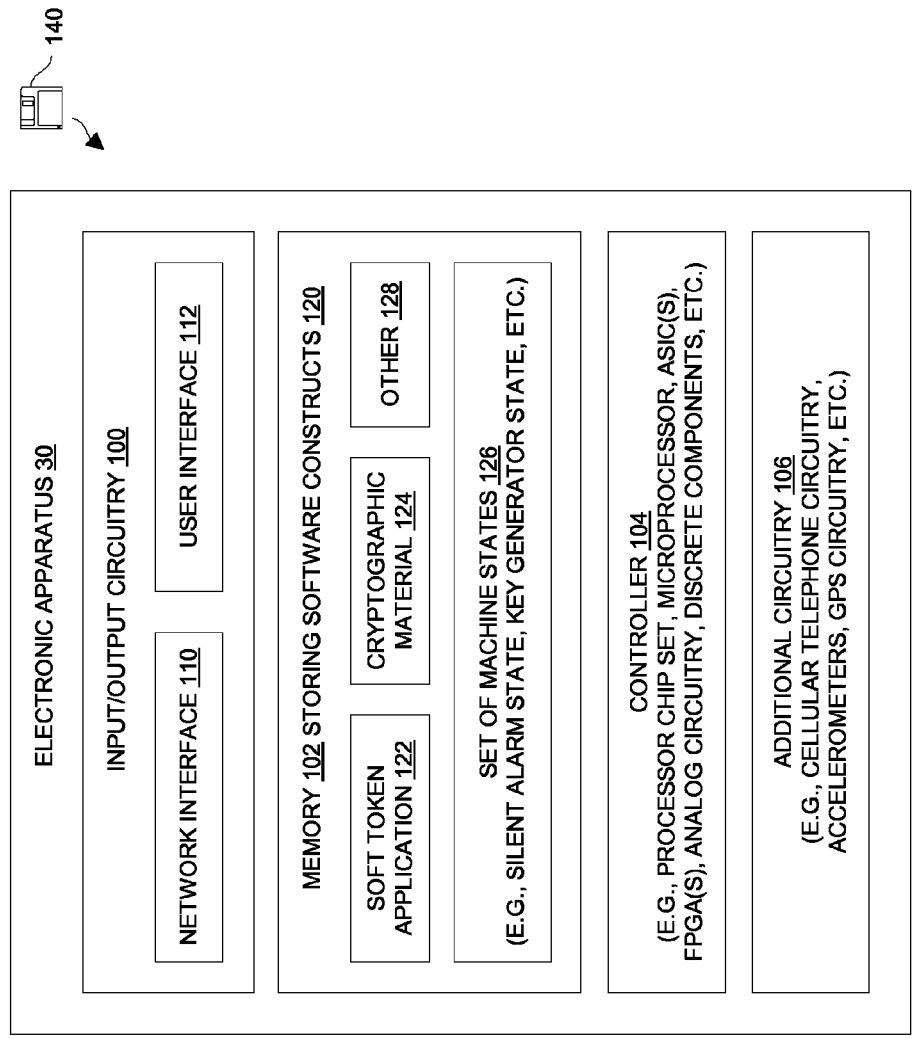
FIG. 2 is a block diagram of the electronic apparatus of the electronic environment of FIG. 1.

FIG. 2 shows particular details of the electronic apparatus 30 of the electronic environment 20. The electronic apparatus 30 includes input/output (IO) circuitry 100, memory 102, a controller 104, and additional circuitry 106.

The IO circuitry 100 is constructed and arranged to control input and output for the electronic apparatus 30. The IO circuitry 100 includes a network interface 110 and a user interface 112. The network interface 110 (e.g., a network card, a wireless transceiver, etc.) is constructed and arranged to connect the electronic apparatus 30 to the computing machine 32 and to the communications medium 38. The user interface 112 (e.g., a keyboard, a pointer, a display, etc.) is constructed and arranged to receive input and provide output to the user 22.

In some arrangements, the network interface 110 of the IO circuitry 100 provides multiple communications pathways. For example, in the context of a mobile device such as a smart phone, a tablet or a laptop, the mobile device may be equipped with Wi-Fi, cellular telephony, Bluetooth, and so on.

In some arrangements, the user interface 112 includes a broad range of user interface components such as a digital camera to capture video input, a microphone and speaker set for audio IO, a touch screen to measure resistance/capacitance/pressure/etc., and so on.

The memory 102 includes volatile storage and non-volatile storage. The memory 102 stores a variety of memory constructs 120 including a soft token application 122, cryptographic material 124 (e.g., a current cryptographic key), a set of machine states 126 (e.g., a silent alarm state, a key generation algorithm, etc.), and other applications and data 128 (e.g., an operating system, control/status information, client applications, a phone book, etc.).

The controller 104 is constructed and arranged to execute and access the various memory constructs 120 stored in the memory 102. It should be understood that the controller 104 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 140 is capable of delivering all or portions of the software to the electronic apparatus 30. The computer program product 140 has a non-transitory (or non-volatile) computer readable medium which stores a set of instructions which controls one or more operations of the electronic apparatus 30. Examples of suitable computer readable storage media include tangible articles of manufacture and apparatus which store instructions in a non-volatile manner such as CD-ROM, flash memory, disk memory, tape memory, and the like.

The additional circuitry 106 includes components for further advanced operability. For example, in the context of a smart phone or similar mobile device, the additional circuitry 106 may include cellular telephone circuitry, accelerometers, GPS circuitry, and so on.

During operation, the controller 104 executes the soft token application 122 to provide an authentication code 42. In particular, the controller 104 generates a token code 44 and auxiliary data 46 (FIG. 1) based on the cryptographic material 124 (e.g., a cryptographic key, derived keys, etc.) and the set of machine states 126 (e.g., a key generation algorithm, control parameters, etc.). In some arrangements, the controller 104 sends the token code 44 and the auxiliary data 46 separately even though the authentication server 34 processes the token code 44 and the auxiliary data 46 together (i.e., as a composite) in the form of an authentication code 42. In other arrangements, the controller 104 sends the token code 44 and the auxiliary data 46 embedded within the authentication code 42.

Upon receipt of the authentication code 42, the authentication server 34 performs an authentication operation to authenticate the user 22. Such authentication can be standard authentication, or risk-based authentication. In particular, the authentication server 34 accesses a user profile 54 from the user database 52 and evaluates the authentication code 42 against expected values derived from the user profile 54. If authentication is successful, the user 22 is permitted access to the computerized resource 50. However, if authentication is unsuccessful, the user 22 is denied access to the computerized resource 50.

In certain situations, the authentication server 34 may not use the reverse channel 82. That is, the authentication server 34 may not send any command 80 to the electronic apparatus 30 and simply allow the electronic apparatus 30 to continue to provide authentication codes 42 based on the current cryptographic material 124 and the current set of machine states 126.

However, upon detection of a particular situation (e.g., detection of a certain number of silent alarms, unsuccessful authentication, operation anomalies, etc.), the authentication server 34 is capable of sending a command 80 through the reverse channel 82 to the electronic apparatus 30. In response to the command 80, the electronic apparatus 30 replaces the set of machine states 126 (e.g., changes a control setting, derives a new key, resets a silent alarm state, chooses a different data source for the auxiliary channel, etc.) to modify the operation of the soft token 40. Such an adjustment in operation provides a mechanism to dynamically strengthen authentication after the soft token 40 has been deployed and in operation for a period of time. Further details will now be provided with reference to FIG. 3.

Figure 3:
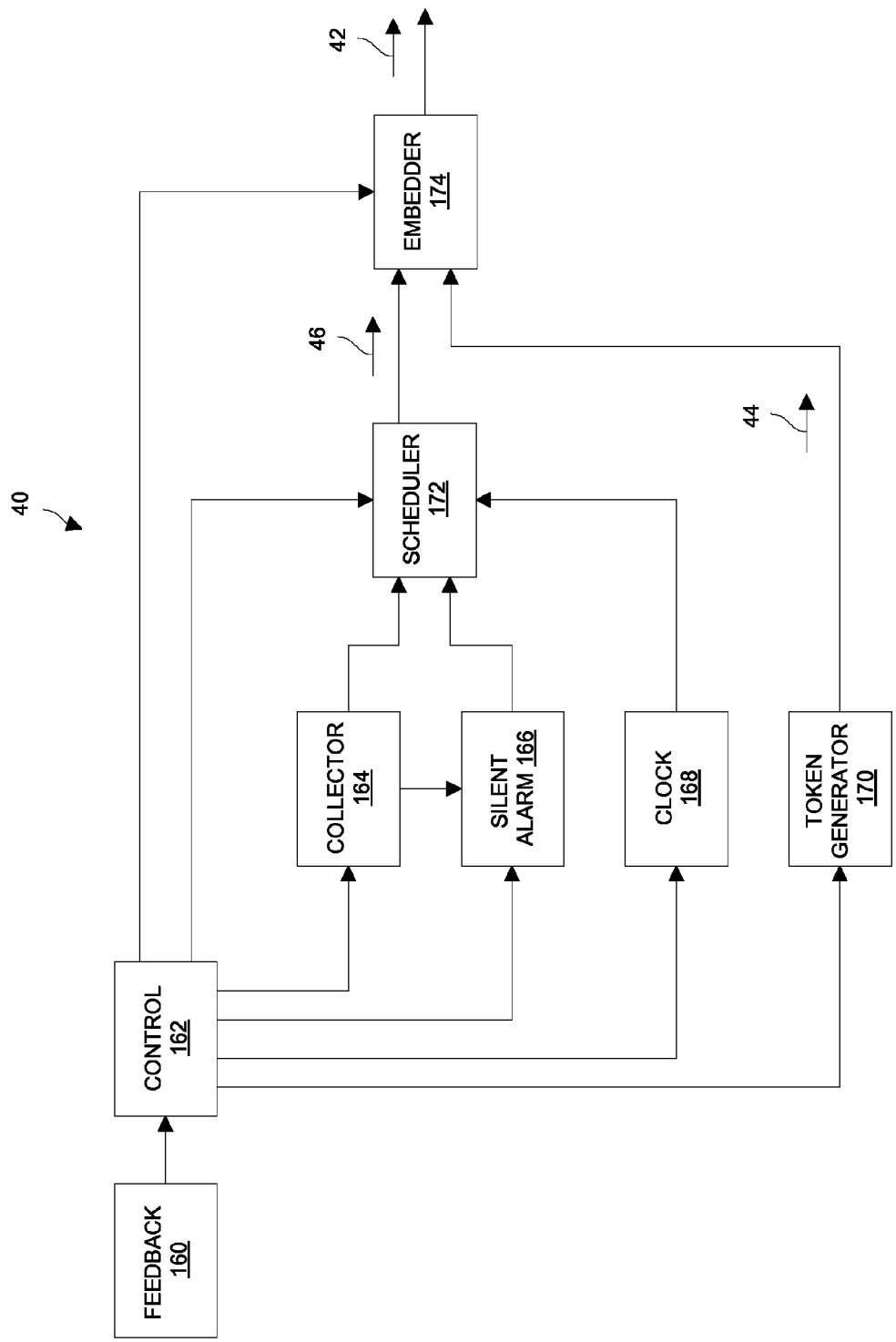
FIG. 3 is a block diagram of particular operational details of the electronic apparatus of FIG. 2.

FIG. 3 shows particular circuitry details of the soft token 40. As shown, the soft token 40 includes a feedback module 160, a control module 162, a collector 164, a silent alarm module 166, a clock module 168, a token generator 170, a scheduler 172, and an embedder 174. In some arrangements, some of these circuits are implemented via a processor running the soft token application 122 (also see the controller 104 and memory 102 in FIG. 2).

The feedback module 160 is constructed and arranged to receive commands 80 from the authentication server 34 through the reverse channel 82. As mentioned earlier, communications with the authentication server 34 through the reverse channel 82 may be direct or indirect.

The control module 162 is constructed and arranged to control the operation of the collector 164, the silent alarm module 166, the clock 168, the token generator 170, and the scheduler 172, and the embedder 174. In particular, the control module 162 carries out particular commands 80 received from the authentication server 34. In particular, the control module 162 takes input received through the feedback module 160 and stores cryptographic material 124 and machine states 126 in the memory 102. The control module 162 then reads these constructs from the memory 102, and controls the various other modules accordingly.

The collector 164 is constructed and arranged to gather information from the various data sources of the electronic apparatus 30 to be transmitted to the authentication server 34 via the auxiliary channel (e.g., via authentication codes 42). It should be understood that the information may cover a wide range of subjects, including, for example, information about the hardware, software, and/or environment of the electronic apparatus 30.

The silent alarm module 166 is constructed and arranged to convey a silent alarm to the authentication server 34 in response to the occurrence of a trigger event (such as may be generated by the collector 164, for example). Trigger events include detection of tampering of the electronic apparatus 30, detection of malware running on the electronic apparatus 30, and/or detection of other suspect activities.

The clock 168 is constructed and arranged to provide a clock signal to the scheduler 172. In some arrangements, the clock signal is shared by other components of the electronic apparatus 30.

The token generator 170 is constructed and arranged to generate the token codes 44. In particular, the token generator 170 receives a seed and key generation algorithm (also see the memory 102 in FIG. 2). The token generator 170 is capable of implementing a variety of techniques which not only provide a rich and robust series of OTPs (e.g., 6 alphanumeric digits, 8 alphanumeric digits, etc. for authentication) but also prevent a hacker from reverse engineering the token generator 170 and/or reading secrets from the token generator 170.

The scheduler 172 is constructed and arranged to provide the auxiliary data 46 (e.g., a set of bits) which will be conveyed to the authentication server 34 through the auxiliary channel. In particular, the control module 162 determines how the scheduler 172 groups collected data into the bits of the auxiliary data 46. For example, depending on the commands 80, the scheduler 172 may assign one of the bits of the auxiliary data 46 to be a silent alarm bit which informs the authentication server 34 that a critical event has occurred in connection with the soft token 40 (e.g., a tamper event). In some examples, the scheduler 172 receives input from the clock 168. The scheduler 172 employs this input in a manner defined by the control module 162, in selecting collected data to be output via the bits of the auxiliary data 46 at different times.

The embedder 174 is constructed and arranged to combine the auxiliary data 46 (e.g., four bits) with a token code 44 from the token generator 170 to form the authentication code 42. It should be understood that the embedder 174 is capable of combining the bits of the auxiliary data 46 and token codes 44 in any suitable way. In one example, the embedder 174 appends the bits of the auxiliary data 46 to the token code 44, and subjects the combination to a reversible blending operation. The blending operation is known to the authentication server 34, which may reverse the blending operation when authentication codes 42 are received, to extract the bits of the auxiliary data 46 and the token code 44. Further details will now be provided by way of an example and with reference to FIG. 4.

Figure 4:
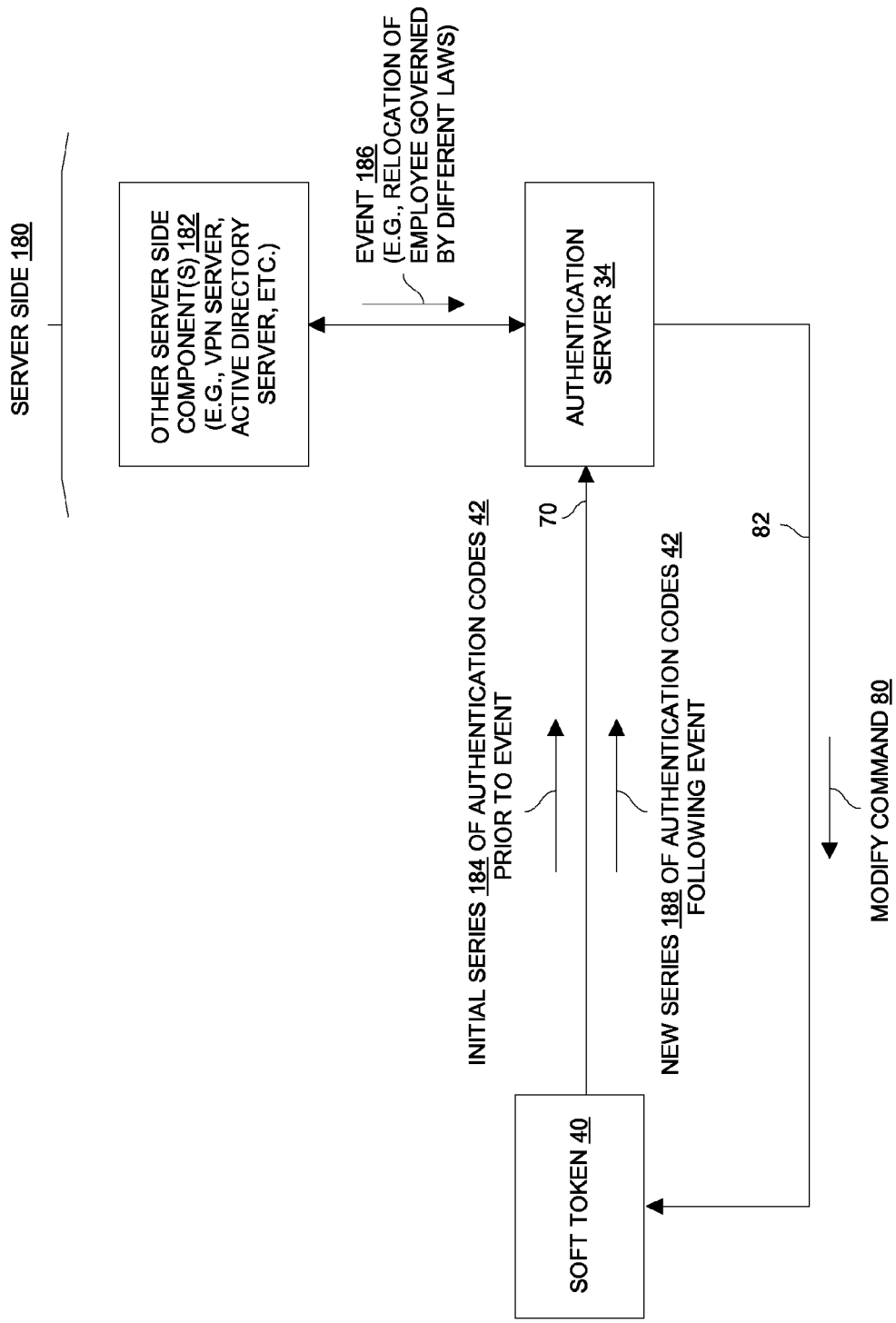
FIG. 4 is a block diagram of an example operation of the electronic environment of FIG. 1.

FIG. 4 shows an example use of the reverse channel 82. In particular, up to this point, the authentication server 34 has been described as the source of the modify command 80. However, the server side (or simply server) 180 of the soft token infrastructure may include several other server side components 182 in communication with each other such as a VPN server, an Active Directory server, and so on. For example, an active directory may be used as a repository of user identities together with user attributes, and a VPN server and the authentication server 34 (e.g., a SecurID or SID server) may use this information to match seed records with identities.

Along these lines, suppose that an active directory server stores information regarding a company employee that currently resides in the United States. Further suppose that the US government currently allows the authentication server 34 to receive geo-location information from a soft token 40 installed on a smart phone. In this situation, the set of machine states 126 (FIG. 2) of the soft token 40 may direct the soft token 40 to include geo-location information taken from GPS circuitry of the smart phone in authentication codes 42 for use in risk-based authentication. Accordingly, the soft token 40 is initially configured to output an initial series 184 of authentication codes 42 containing, as the auxiliary data 46, geo-location information. During this time, the authentication server 34 receives the authentication codes 42 and authenticates the company employee based on the authentication codes 42 containing the geo-location information (also see the user 22 in FIG. 1).

Now suppose that the company wishes to transfer the employee to a country which prohibits use of GPS circuitry or transmission of geo-location information in the above-described manner. For example, employees in Germany currently may be governed by a law that prevents transmission of geo-location information in the manner described above. In this situation, the company updates the active directory (see other server side components 182 in FIG. 4) with this information which results in the active directory sending a notification signal 186 to inform the authentication server 34 of the transfer event. In particular, the authentication server 34 is informed that the company employee will now need to comply with certain access policies that will be applied on future logins.

In response to the event 186, the authentication server 34 sends an appropriate modify command 80 to the soft token 40 through the reverse channel 82 directing the soft token 40 to modify its operation. In particular, the modify command 80 modifies the set of machine states 126 in memory 102 (FIG. 2). Such modification is processed by the control module 162 by selecting different auxiliary data 46 to provide to the scheduler 172 (FIG. 3). For example, the command 80 may select biometric data, hardware fingerprints, and/or software posture to be provided as the auxiliary data 46 in place of geo-location information. Accordingly, the soft token 40 is now reconfigured to provide a new series 188 of authentication codes 42 following the event. Such operation enables the soft token 40 to continue to provide rich authentication information for stronger authentication vis-à-vis bare OTPs.

Figure 5:
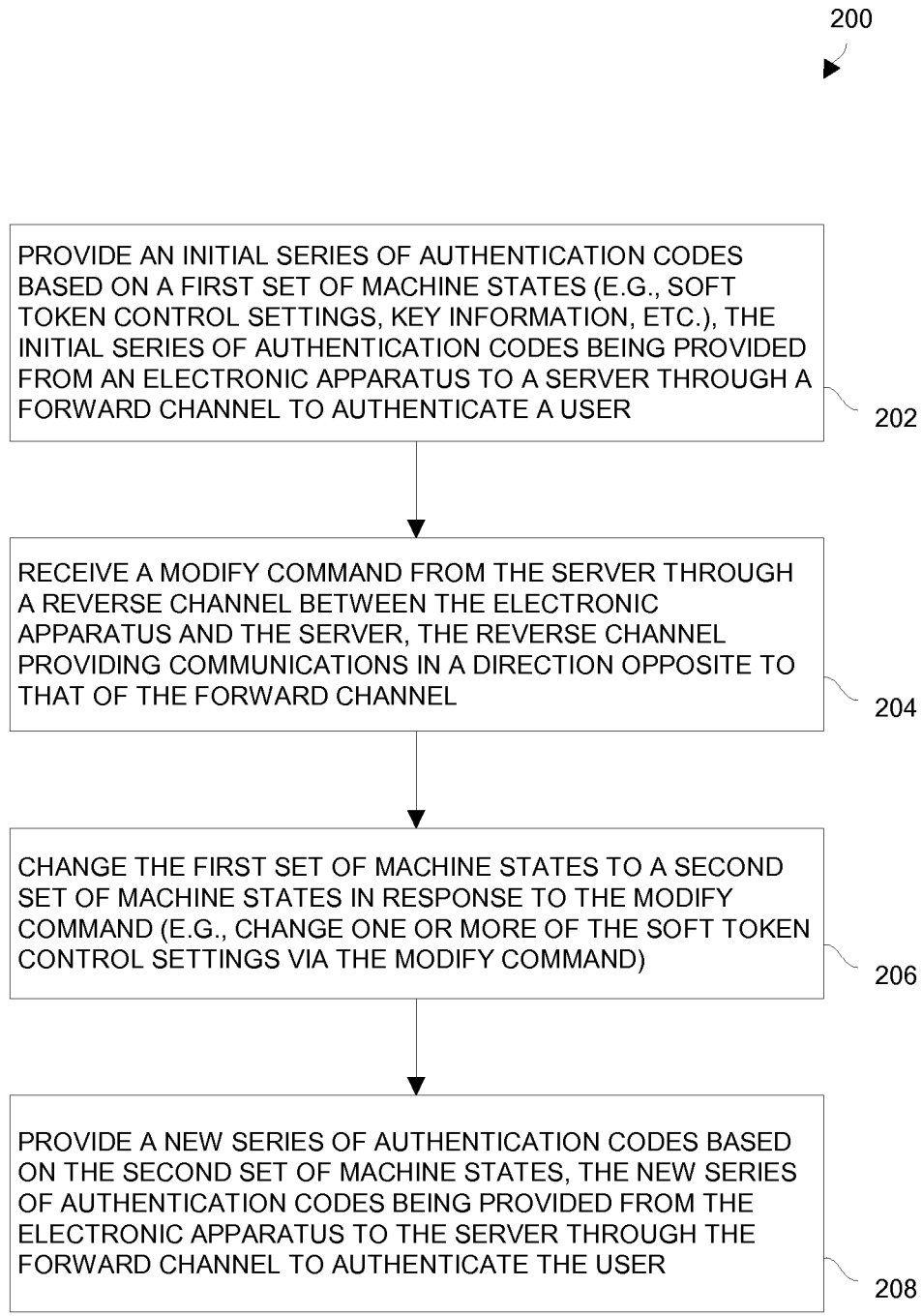
FIG. 5 is a flowchart of a procedure which is performed by the electronic apparatus of FIG. 2.

FIG. 5 is a flowchart of a procedure 200 which is performed by the electronic apparatus 30 to control operation of a soft token 40. In step 202, the electronic apparatus 30 provides an initial series 184 of authentication codes 42 (FIG. 4) based on a first set of machine states 126 (FIG. 3). The initial series 184 of authentication codes 42 is provided from the electronic apparatus 30 to a server 180 through a forward channel 70 to authenticate a user 22.

In step 204, the electronic apparatus 30 receives a modify command 80 from the server 180 through a reverse channel 82 between the electronic apparatus 30 and the server 180. The reverse channel 82 provides communications in a direction opposite to that of the forward channel 70.

In step 206, the electronic apparatus 30 changes the first set of machine states 126 to a second set of machine states 126 in response to the modify command 80. In particular, the modify command 80 changes at least one of the machine states 126 to remotely adjust the operation of the soft token 40 after a period of operation (i.e., step 202).

In step 208, the electronic apparatus 30 provides a new series 188 of authentication codes 42 based on the second set of machine states 126. The new series 188 of authentication codes 42 is provided from the electronic apparatus 30 to the server 180 through the forward channel 70 to authenticate the user 22.

As described above, an improved technique involves controlling a soft token 40 through a reverse channel 82 from a server 180 to the soft token 40. With the availability of such a reverse channel 82, the server 180 is able to direct the soft token 40 to adjust operation such as provide additional information regarding the soft token's hardware fingerprint/software posture/biometric factors, change selection of sources of auxiliary information, etc. Additionally, the server 180 is able to reset aspects of the soft token 40 such as re-seed the soft token 40, reset a silent alarm state of the soft token 40, fully reset the operational state of the soft token 40, partially reset the state of the soft token 40, and so on. Such reverse channel capabilities enrich the operability of the soft token 40 as well as provide a mechanism for dynamically strengthening authentication after soft token deployment.

While various embodiments of the invention have been particularly shown and described, it will be understood by those skilled in the art that various changes in form and details may be made therein without departing from the spirit and scope of the invention as defined by the appended claims.

For example, the collector 164 was described above as providing a variety of data to the scheduler 172. It should be understood that various sources of information are suitable for use by the collector 164 such as a camera and circuitry to perform face recognition, a microphone and circuitry to perform voice recognition, an accelerometer and circuitry to perform walking gait recognition, a touch screen and circuitry to evaluate typing rhythm and swiping habits, combinations thereof, and so on. Additionally, other data sources are suitable for use as well such as GPS circuitry to provide geo-location information, browser circuitry to provide data on browsing habits, etc. The various available selections are enhanced based on standard features and equipment now available on the electronic apparatus 30.

In terms of identifying hardware fingerprints, the soft token 40 is capable of reading hardware information from the hardware of the electronic apparatus 30. Such information may include serial numbers, hardwired settings, the availability of certain peripheral and circuit components, etc.

In terms of identifying software posture, the soft token 40 is capable of scanning for the existence of certain data, files and functions which are available on the hardware of the electronic apparatus 30. Such information may include serial numbers, version numbers, certificates/licenses, and so on.

In terms of identifying a silent alarm state, the soft token 40 is capable of storing a current silent alarm state and updating that silent alarm state in response to certain events such as detected tampering activities. Such activities may include a reset or performance of a privileged function, a detected soft token copying event, a detection of a significant change in time, and so on.

Additionally, it should be understood that a variety of activities can be controlled by the modify command 80 (see the various arrows extending from the control module 162 in FIG. 4). For example, in addition to selecting different sources of auxiliary data 46 to send through the auxiliary channel, the modify command 80 may reset various operations of the soft token 40. Examples include re-seeding the soft token, resetting the key generator algorithm or forward secure pseudo random number generator (FS-PRNG), resetting a silent alarm state, resetting other soft token states, changing a policy, combinations thereof, and so on.

In some arrangements, the command 80 directs a partial reset of a machine state rather than a full reset. For example, if the basic operation in a FS-PRNG is a hash that uses, as input, the FS-PRNG state, the device time, other input (in order to give the hash a unique "flavor"), and some initially fixed "ctr" field, then the reverse channel 82 is capable of being used to indicate that only the "ctr" field needs to be reset to a new value.

Furthermore, it should be understood that the above-provided description primarily mentioned a reverse channel 82 in the context of a soft token 40. However, it should be understood that a reverse channel 82 could be provided to a hardware token as well. For example, some hardware tokens are provisioned with an interface such as USB or similar style port. For these devices, a command 80 can be conveyed through that interface to control operation of the token 40. Such modifications and enhancements belong to various embodiments and arrangements of the current disclosure.

What is claimed is:

1. A method of controlling a soft token running within an electronic apparatus, the method comprising:
   providing, by the electronic apparatus, an initial series of authentication codes based on a first set of machine states, the initial series of authentication codes being provided from the electronic apparatus to a server through a forward channel to authenticate a user;
   receiving, by the electronic apparatus, a modify command from the server through a reverse channel between the electronic apparatus and the server, the reverse channel providing communications in a direction opposite to that of the forward channel;
   changing, by the electronic apparatus, the first set of machine states to a second set of machine states in response to the modify command; and
   providing, by the electronic apparatus, a new series of authentication codes based on the second set of machine states, the new series of authentication codes being provided from the electronic apparatus to the server through the forward channel to authenticate the user;
   wherein each authentication code of the initial series and the new series of authentication codes includes a respective one-time use passcode (OTP);
   wherein the initial series of authentication codes includes auxiliary data from an initial auxiliary data source of the electronic apparatus;
   wherein changing the first set of machine states to the second set of machine states in response to the modify command includes selecting a new auxiliary data source of the electronic apparatus from which to obtain auxiliary data in place of the initial auxiliary data source;
   wherein at least some authentication codes of the new series of authentication codes includes data from the new auxiliary data source;
   wherein the initial auxiliary data source is a silent alarm module residing within the electronic apparatus which outputs a silent alarm in response to detection of a suspicious tampering activity; and
   wherein providing the initial series of authentication codes includes sending a respective OTP which includes the silent alarm to alert the server that the silent alarm module residing within the electronic apparatus has detected the suspicious tampering activity.

2. A method as in claim 1 wherein receiving the modify command from the server through the reverse channel between the electronic apparatus and the server includes:
   obtaining the modify command via a message which is processed directly by the soft token running within the electronic apparatus.

3. A method as in claim 1 wherein receiving the modify command from the server through the reverse channel between the electronic apparatus and the server includes:
   obtaining the modify command via a message which is processed directly by an intermediate application running within the electronic apparatus; and
   conveying the modify command from the intermediate application running within the electronic apparatus to the soft token running within the electronic apparatus.

4. A method as in claim 1 wherein the initial series of authentication codes is derived from a first key generation algorithm;
   wherein changing the first set of machine states to the second set of machine states in response to the modify command includes replacing the first key generation algorithm with a second key generation algorithm; and
   wherein the new series of authentication codes is derived from the second key generation algorithm.

5. A method as in claim 1 wherein the initial series of authentication codes includes data identifying progression to a subsequent silent alarm state from an initial silent alarm state;
   wherein changing the first set of machine states to the second set of machine states in response to the modify command includes replacing the subsequent silent alarm state with a new silent alarm state which is different than the initial silent alarm state and the subsequent silent alarm state; and
   wherein at least some authentication codes of the new series of authentication codes includes data identifying the new silent alarm state.

6. A method as in claim 1 wherein providing the new series of authentication codes based on the second set of machine states includes:
   sending OTPs and auxiliary data in a single embedded signal to the server for user authentication.

7. A method as in claim 1 wherein providing the new series of authentication codes based on the second set of machine states includes:
   sending OTPs through a first channel to the server, and auxiliary data through a second channel to the server, the first and second channels being separate and distinct from each other.

8. A method as in claim 1 wherein the modify command includes, in an operation identifier field, an operation identifier; and
   wherein receiving the modify command from the server through the reverse channel between the electronic apparatus and the server includes selecting one of multiple operations to perform based on the operation identifier, the operation identifier having been selected by the server based on a set of previous authentication operations performed by the server.

9. An electronic apparatus, comprising:
   input/output (IO) circuitry;
   memory which stores a first set of machine states; and
   a controller coupled to the IO circuitry and the memory, the controller being constructed and arranged to:
      provide an initial series of authentication codes based on the first set of machine states, the initial series of authentication codes being provided from the IO circuitry of the electronic apparatus to a server through a forward channel to authenticate a user,
      receive a modify command from the server through a reverse channel between the IO circuitry of the electronic apparatus and the server, the reverse channel providing communications in a direction opposite to that of the forward channel,
      store a second set of machine states in response to the modify command, and
      provide a new series of authentication codes based on the second set of machine states, the new series of authentication codes being provided from the IO circuitry of the electronic apparatus to the server through the forward channel to authenticate the user;
   wherein each authentication code of the initial series and the new series of authentication codes includes a respective one-time use passcode (OTP);

wherein the initial series of authentication codes includes auxiliary data from an initial auxiliary data source of the electronic apparatus;

wherein the controller, when changing the first set of machine states to the second set of machine states in response to the modify command is constructed and arranged to select a new auxiliary data source from which to obtain auxiliary data in place of the initial auxiliary data source;

wherein at least some authentication codes of the new series of authentication codes includes data from the new auxiliary data source;

wherein the initial auxiliary data source is a silent alarm module within the electronic apparatus which outputs a silent alarm in response to detection of a suspicious tampering activity; and wherein providing the initial series of authentication codes includes sending a respective OTP which includes the silent alarm to alert the server that the silent alarm module has detected the suspicious tampering activity.

10. An electronic apparatus as in claim 9 wherein the initial series of authentication codes is derived from a first key generation algorithm;
   wherein the controller, when changing the first set of machine states to the second set of machine states in response to the modify command is constructed and arranged to replace the first key generation algorithm with a second key generation algorithm; and
   wherein the new series of authentication codes is derived from the second key generation algorithm.

11. An electronic apparatus as in claim 9 wherein the initial series of authentication codes includes data identifying progression to a subsequent silent alarm state from an initial silent alarm state;
   wherein the controller, when changing the first set of machine states to the second set of machine states in response to the modify command is constructed and arranged to replace the subsequent silent alarm state with a new silent alarm state which is different than the initial silent alarm state and the subsequent silent alarm state; and
   wherein at least some authentication codes of the new series of authentication codes includes data identifying the new silent alarm state.

12. A computer program product which includes a non-transitory computer readable medium storing a set of instructions to control a soft token running within computing circuitry, the set of instructions causing the computing circuitry to perform a method, comprising:
   providing, by the computing circuitry, an initial series of authentication codes based on a first set of machine states, the initial series of authentication codes being provided from the computing circuitry to a server through a forward channel to authenticate a user;
   receiving, by the computing circuitry, a modify command from the server through a reverse channel between the computing circuitry and the server, the reverse channel providing communications in a direction opposite to that of the forward channel;
   changing, by the computing circuitry, the first set of machine states to a second set of machine states in response to the modify command; and
   providing, by the computing circuitry, a new series of authentication codes based on the second set of machine states, the new series of authentication codes being provided from the computing circuitry to the server through the forward channel to authenticate the user;
   wherein each authentication code of the initial series and the new series of authentication codes includes a respective one-time use passcode (OTP);
   wherein the initial series of authentication codes includes auxiliary data from an initial auxiliary data source of the computing circuitry;
   wherein changing the first set of machine states to the second set of machine states in response to the modify command includes selecting a new auxiliary data source of the computing circuitry from which to obtain auxiliary data in place of the initial auxiliary data source;
   wherein at least some authentication codes of the new series of authentication codes includes data from the new auxiliary data source;
   wherein the initial auxiliary data source is a silent alarm module, formed by the computing circuitry, which outputs a silent alarm in response to detection of a suspicious tampering activity; and
   wherein providing the initial series of authentication codes includes sending a respective OTP which includes the silent alarm to alert the server that the silent alarm module has detected the suspicious tampering activity.

13. A computer program product as in claim 12 wherein the initial series of authentication codes is derived from a first key generation algorithm;
   wherein changing the first set of machine states to the second set of machine states in response to the modify command includes replacing the first key generation algorithm with a second key generation algorithm; and
   wherein the new series of authentication codes is derived from the second key generation algorithm.

14. A computer program product as in claim 12 wherein the initial series of authentication codes includes data identifying progression to a subsequent silent alarm state from an initial silent alarm state;
   wherein changing the first set of machine states to the second set of machine states in response to the modify command includes replacing the subsequent silent alarm state with a new silent alarm state which is different than the initial silent alarm state and the subsequent silent alarm state; and
   wherein at least some authentication codes of the new series of authentication codes includes data identifying the new silent alarm state.

15. A method as in claim 1 wherein providing the new series of authentication codes includes:
   providing, from the electronic apparatus to the server, data from the new auxiliary data source in place of data from the initial auxiliary data source due to a change in electronic apparatus machine states in response to the modify command.

16. A method as in claim 1 wherein receiving the modify command includes:
   acquiring the modify command from the server in response to detection of the silent alarm by the server in the initial series of authentication codes.

17. A method as in claim 1 wherein the silent alarm alerts the server that the silent alarm module has detected occurrence of suspicious tampering activity within the electronic apparatus.

18. A method as in claim 1 wherein the silent alarm alerts the server that the silent alarm module has detected malware running on the electronic apparatus.

* * * * *